UNITED STATES PATENT OFFICE.

CARL LUDWIG MÜLLER, OF LUDWIGSHAFEN, GERMANY, ASSIGNOR TO THE BADISCHE ANILIN AND SODA FABRIK, OF SAME PLACE.

BROWN-YELLOW DYE.

SPECIFICATION forming part of Letters Patent No. 546,177, dated September 10, 1895.

Application filed April 11, 1895. Serial No. 545,383. (Specimens.)

*To all whom it may concern:*

Be it known that I, CARL LUDWIG MÜLLER, doctor of philosophy, a subject of the King of Bavaria, residing at Lugwigshafen-on-the-Rhine, in the Kingdom of Bavaria and Empire of Germany, have invented new and useful Improvements in the Manufacture of new Basic Coloring-Matter, of which the following is a specification.

My invention consists in the manufacture of new basic coloring-matter which appears in its chemical constitution to be related to the acridin series and to resemble phosphin in its properties. The said new coloring-matter is obtained from certain substituted auramins by treatment, as hereinafter described. The substituted auramins, which appear to be most suited for conversion into the new coloring-matters, are the meta-amido-phenyl-auramins and meto-amido-tolyl-auramins, which can be regarded as derivatives of meta-phenylene and toluylene-diamin on the one hand and on the other hand of tetra-methyl or tetra-ethyl-diamido-diphenyl-methane. The hydrochlorates of the said substituted auramins on heating either by themselves or admixed with meta-phenylene-diamin and meta-toluylene-diamin—as such or as hydrochlorates—with or without the addition of a condensing agent yield the new coloring-matter. As an instance of a suitable condensing agent, I mention chloride of zinc.

The substituted auramins can be prepared in the manner described in the specification of English Letters Patent No. 5,741, of 1884, or any other known or suitable method for the preparation of auramin dyes may be used. I have found that it is usually not necessary to use pure isolated substituted auramins, but that the crude melt or reaction product containing the said substituted auramins can be and preferably is directly used in the process according to this invention.

The following example will serve to further illustrate the nature of the invention, but it can be varied in many respects, and I do not confine myself to the said example. The parts are by weight.

*Example: Production of a meta-amido-phenyl-auramin and its conversion into new coloring-matter.*—Mix together about forty (40) parts of tetra-methyl-diamido-benzophenone, twenty-seven (27) parts of meta-phenylene-diamin-dihydrochlorate and about nine (9) parts of meta-phenylene-diamin-base and heat the mixture on the oil-bath in a closed enameled vessel provided with an outlet for the vapors evolved, and furnished with a stirrer. Stir continuously and maintain the temperature of the oil-bath at about from one hundred and ninety-five to two hundred and fifteen degrees centigrade (195° to 215°C.) The substituted auramin dye is first formed, but it is gradually converted into new coloring-matter. Withdraw test portions from time to time, dissolve them in dilute hydrochloric acid, and boil the solution. The substituted auramin yields under these conditions an orange-yellow solution, which becomes nearly colorless on boiling, while the new coloring-matter yields a brownish-yellow solution, which remains unchanged on boiling. Interrupt the heating of the whole melt when the tests show that no further change into the new coloring-matter is taking place. This usually takes about from four to seven (4 to 7) hours. Allow the melt to cool. It solidifies to a dark-colored mass possessing a greenish metallic luster, dissolve the whole in about four hundred (400) parts of boiling water, to which about twenty (20) parts of hydrochloric acid (containing about thirty per cent. (30%) real acid HCl) have been added. Allow the liquid to cool and then filter and precipitate the coloring-matter from the filtered solution by the addition of common salt and chlorid of zinc. Collect the precipitate and mix it with twenty (20) parts of hydrochloric acid (containing about thirty per cent. (30%) real acid HCl) and heat the mixture on the water-bath in order to obtain a readily soluble salt. Next evaporate to dryness and reduce to powder.

Under certain conditions a brownish coloring-matter is formed besides the desired coloring-matter. This can readily be removed from the product by taking advantage of its lesser solubility in hydrochloric acid. The formation of this product has especially been noticed when the temperature of the melt has risen too high.

Instead of meta-phenylene-diamin in the above example meta-toluylene-diamin can be used, and similarly also the tetra-ethyl-diamido-benzo-phenone can be used instead of the methyl derivative. In this case it is advisable to add zinc chlorid to the melt. The coloring-matter resulting when making these variations is practically the same.

The same coloring-matter can also be obtained by heating the hydrols derived from the methane compounds hereinbefore mentioned with the meta-diamins, together with the hydrochlorates thereof. My new coloring-matter, however obtained, is characterized by the following properties: it occurs as a dark brownish powder, it is readily soluble in water and spirits of wine, giving a brownish-yellow solution possessing a green fluorescence. It is practically insoluble in benzene and ether. It is more particularly characterized and distinguished from known coloring-matters which most nearly resemble it by its behavior with concentrated hydrochloric acid in which it dissolves, giving an orange-brown solution possessing a yellowish fluorescence. It can also be distingushed, as a rule, by treating an aqueous solution with nitrous acid. Thus on adding hydrochloric acid and sodium nitrite the solution turns dark greenish or gets discolored and on standing a brown precipitate is formed.

My new coloring-matter dyes cotton mordanted with tannin with brownish-yellow shades, and it is also suitable for producing useful brownish-yellow shades on leather.

Now, what I claim is—

1. The process for the manufacture of basic coloring matter which consists in heating the hydrochlorate of a substituted auramine such as meta-amido-phenyl-auramine, then allowing the melt to cool, then dissolving the same in water acidulated with hydrochloric acid, then precipitating the coloring matter by the addition of common salt and chloride of zinc substantially as described.

2. As a new article of manufacture the new basic coloring matter which can be obtained by heating the hydrochlorate of a substituted auramine and which occurs as a dark brownish powder readily soluble in water and in spirits of wine giving brownish yellow solutions possessing a green fluorescence, soluble in concentrated hydrochloric acid yielding an orange brown solution possessing a yellowish fluorescence, and which on treatment with nitrous acid in aqueous solution yields a dark greenish or discolored solution from which a brown precipitate separates substantially as described.

In testimony whereof I have hereunto set my hand in the presence of two subscribing witnesses.

CARL LUDWIG MÜLLER.

Witnesses:
ERNEST F. EHRHART,
PAUL JULIUS.